United States Patent
Kassen et al.

(10) Patent No.: US 10,316,492 B2
(45) Date of Patent: Jun. 11, 2019

(54) ACTIVE FORCE/VIBRATION FEEDBACK CONTROL METHOD AND APPARATUS FOR A MOVABLE MACHINE

(71) Applicant: CNH Industrial America LLC, New Holland, PA (US)

(72) Inventors: Gary R. Kassen, Burr Ridge, IL (US); Duqiang Wu, Bolingbrook, IL (US); Aditya Singh, Auburn, AL (US); Uli Melchinger, Kleinmachnow (DE); Navneet Gulati, Naperville, IL (US); Patrick T. Dean, St. Louis, MO (US)

(73) Assignee: CNH Industrial America LLC, New Holland, PA (US)

( * ) Notice: Subject to any disclaimer, the term of this patent is extended or adjusted under 35 U.S.C. 154(b) by 38 days.

(21) Appl. No.: 15/500,815

(22) PCT Filed: Jul. 30, 2015

(86) PCT No.: PCT/US2015/042790
§ 371 (c)(1),
(2) Date: Jan. 31, 2017

(87) PCT Pub. No.: WO2016/019091
PCT Pub. Date: Feb. 4, 2016

(65) Prior Publication Data
US 2017/0218600 A1 Aug. 3, 2017

Related U.S. Application Data

(60) Provisional application No. 62/031,207, filed on Jul. 31, 2014.

(51) Int. Cl.
*E02F 9/20* (2006.01)
*A01B 71/02* (2006.01)
(Continued)

(52) U.S. Cl.
CPC ............ *E02F 9/2004* (2013.01); *A01B 71/02* (2013.01); *B60W 50/16* (2013.01); *E02F 3/3414* (2013.01);
(Continued)

(58) Field of Classification Search
CPC ......... E02F 9/2004; E02F 3/3414; E02F 9/24; A01B 71/02; B60W 50/16; G05B 11/01; G05B 2219/37396
(Continued)

(56) References Cited

U.S. PATENT DOCUMENTS

| 4,800,721 A | 1/1989 | Cemenska et al. |
| 5,019,761 A * | 5/1991 | Kraft .................... G05B 19/427 318/568.1 |

(Continued)

FOREIGN PATENT DOCUMENTS

EP          2535467 A1     12/2012

*Primary Examiner* — Marthe Y Marc-Coleman
(74) *Attorney, Agent, or Firm* — Patrick M. Sheldrake; Peter K. Zacharias

(57) ABSTRACT

A movable machine including a chassis, a tool coupled to the chassis, an operator control carried by the chassis and a controller. The controller is communicatively coupled to the operator control. The controller being configured to send a force feedback and/or a vibration feedback to the operator control thereby conveying information to the operator. The information is not related to a load encountered by the tool.

20 Claims, 10 Drawing Sheets

(51) Int. Cl.
  *B60W 50/16*   (2012.01)
  *E02F 3/34*    (2006.01)
  *E02F 9/24*    (2006.01)
  *G05B 11/01*   (2006.01)
  *G05G 5/03*    (2008.04)

(52) U.S. Cl.
  CPC .............. *E02F 9/24* (2013.01); *G05B 11/01* (2013.01); *G05G 5/03* (2013.01); *G05B 2219/37396* (2013.01)

(58) Field of Classification Search
  USPC .......................................................... 701/50
  See application file for complete search history.

(56) References Cited

U.S. PATENT DOCUMENTS

| | | | |
|---|---|---|---|
| 5,347,204 A | 9/1994 | Gregory et al. | |
| 5,396,266 A | 3/1995 | Brimhall | |
| 5,734,373 A * | 3/1998 | Rosenberg | A63F 13/06 345/161 |
| H001850 H | 6/2000 | Zimmermann | |
| 6,429,849 B1 | 8/2002 | An et al. | |
| 6,836,982 B1 | 1/2005 | Augustine | |
| 7,675,258 B2 | 3/2010 | Dattilo et al. | |
| 8,352,108 B2 * | 1/2013 | Martini | B60W 10/06 701/22 |
| 9,050,999 B2 * | 6/2015 | Kuipers | B62D 6/008 |
| 2008/0208416 A1 | 8/2008 | Yuet et al. | |
| 2008/0238352 A1 * | 10/2008 | Dattilo | G05G 1/04 318/575 |
| 2008/0275596 A1 | 11/2008 | Tarasinski et al. | |
| 2009/0018730 A1 | 1/2009 | Tarasinski et al. | |
| 2009/0143941 A1 | 6/2009 | Tarasinski et al. | |
| 2010/0018726 A1 | 1/2010 | Chiocco | |
| 2012/0253593 A1 | 10/2012 | Tran et al. | |
| 2013/0197754 A1 * | 8/2013 | Lee | B60G 17/0157 701/37 |
| 2014/0297116 A1 * | 10/2014 | Anderson | H02K 5/12 701/37 |
| 2016/0229449 A1 * | 8/2016 | Kleinau | B62D 5/0484 |

\* cited by examiner

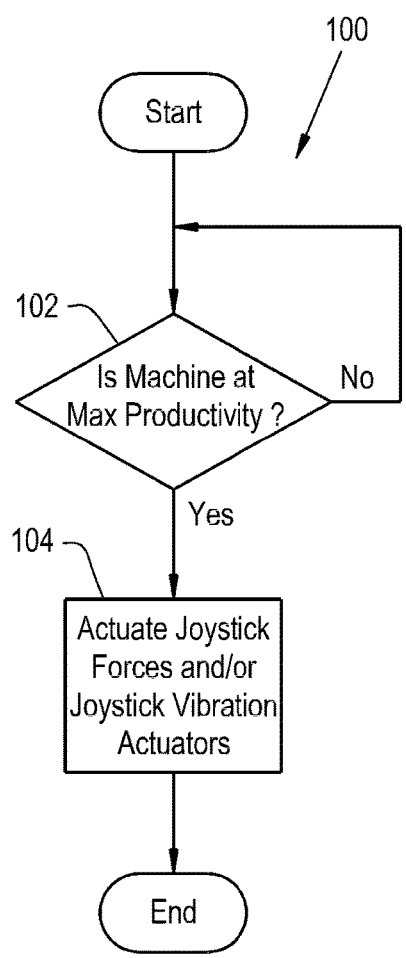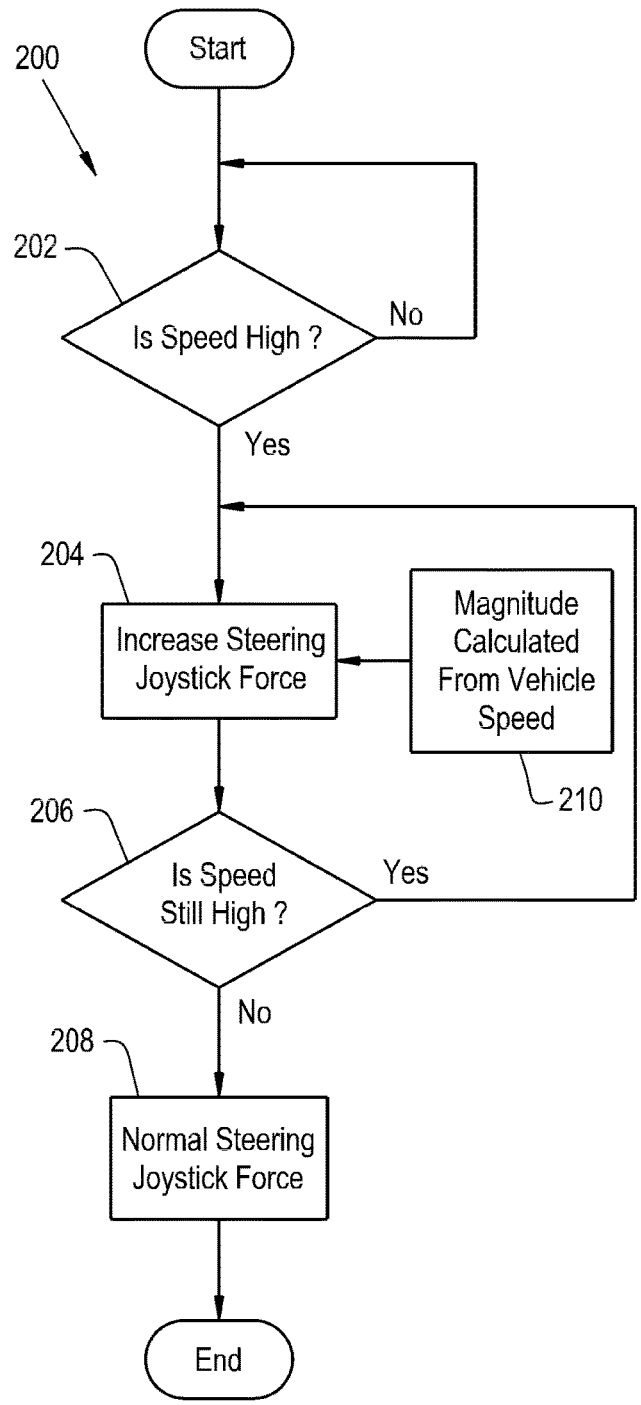
Fig. 3
Fig. 4

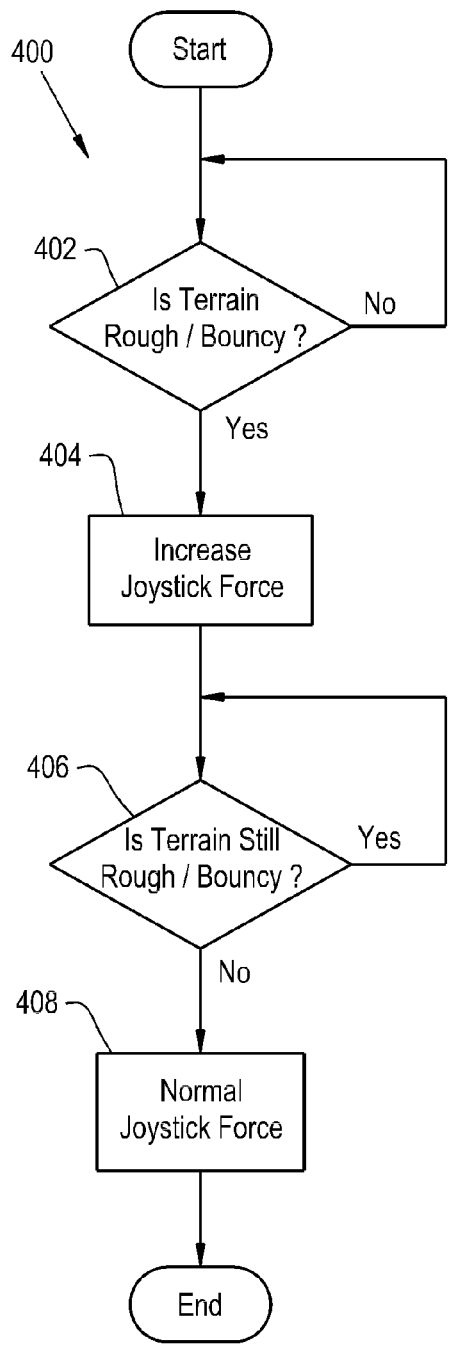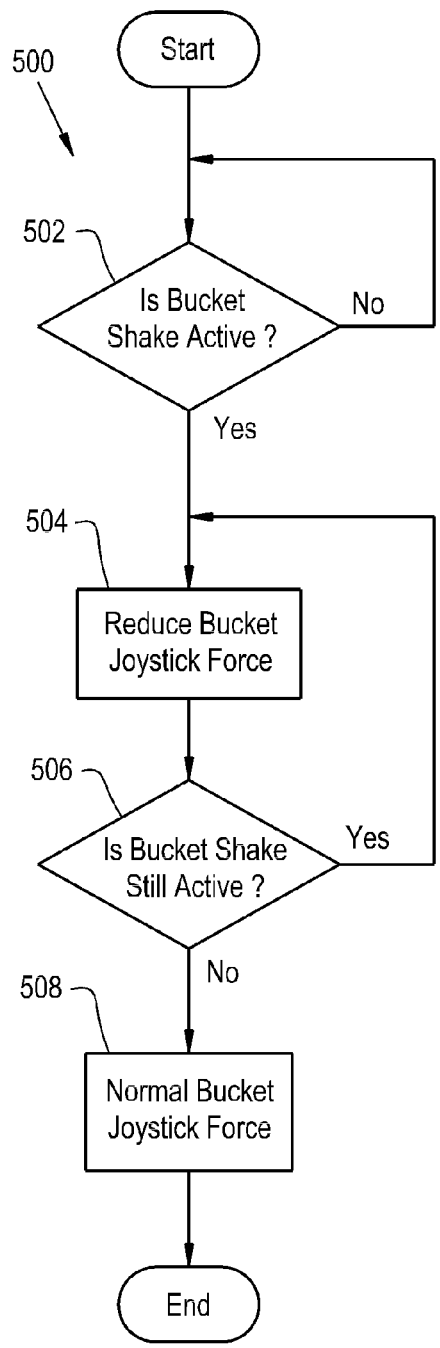
Fig. 6
Fig. 7

ACTIVE FORCE/VIBRATION FEEDBACK CONTROL METHOD AND APPARATUS FOR A MOVABLE MACHINE

CROSS REFERENCE TO RELATED APPLICATION

This application is the National Stage of International Application No. PCT/US2015/042790 filed Jul. 30, 2015, which claims priority to U.S. Provisional Patent Application No. 62/031,207 filed Jul. 31, 2014, the contents of which are incorporated herein by reference.

BACKGROUND OF THE INVENTION

1. Field of the Invention

The present invention relates to vehicular controls and more specifically to a feedback regime for a vehicular control.

2. Description of the Related Art

Vehicles such as skid steer loaders are a mainstay of agricultural and construction work. In their most common configuration, they have two drive wheels on each side of a chassis that are driven in rotation by one or more hydraulic motors coupled to the wheels on one side and another one or more hydraulic motors coupled to the wheels on the other side.

The wheels on one side of the vehicle can be driven independently of the wheels on the other side of the vehicle. This permits the wheels on opposing sides of the vehicle to be rotated at different speeds, in opposite directions, or both. By rotating in opposite directions, the skid steer can rotate in place about a vertical axis that extends through the vehicle itself.

The vehicles often have an overall size of about 4×8' to 7×12' feet which, when combined with their ability to rotate in place, gives them considerable mobility at a worksite. This mobility makes them a preferred vehicle.

Skid steer vehicles have at least one loader lift arm that is pivotally coupled to the chassis of the vehicle to raise and lower at the operator's command. This arm typically has a bucket, blade, or other implement attached to the end of the arm that is lifted and lowered thereby. Perhaps most commonly, a bucket is attached to the arm and the skid steer vehicle. This bucket is commonly used to carry supplies or particulate matter such as gravel, sand, or dirt around a worksite.

Joysticks are well known and widely employed for operator input of vehicles including skid steer loaders. Joysticks are frequently used on vehicles having significant hydraulic operational components, such as hydraulically powered drive means, steering means, and work implements e.g., buckets in the case of front-end loaders, or booms in the case of excavators and back-hoes.

The operating position for joystick controlled vehicles typically provides for an operator to be in a sitting position. Armrests are often provided for the operator with the joysticks conveniently located proximate to the armrest for reducing operator fatigue. Reduced fatigue may, in turn, advance worker safety for both the vehicle operator, and others working in the vicinity of the vehicle. The joysticks allow operators of agricultural and construction equipment to control various vehicle and/or implement functions.

In the past, force feedback systems of a control related to a load encountered by a load bucket or blade of a vehicle, which was undertaken to give the operator a feel for the load that is being applied to the implement. Such a device is detailed in U.S. Pat. No. 4,800,721.

A problem with the monolithic approach of the past is that other information has to be conveyed by way of another system or display rather than the operator control.

What is needed in the art is a control method to convey a multitude of information to an operator of a control device by way of that control device.

SUMMARY OF THE INVENTION

The invention seeks to provide a feedback control system and method that will expand the utility of the control in a simplified, economical and easy to understand way.

In one form, the invention is directed to a movable machine including a chassis, a tool coupled to the chassis, an operator control carried by the chassis and a controller. The controller is communicatively coupled to the operator control. The controller is configured to send a force and/or vibration feedback to the operator control thereby conveying information to the operator. The information is not related to a load encountered by the tool.

In another form, the invention is a force and/or vibration feedback method for an operator control of a movable machine, the machine having a chassis, a tool coupled to the chassis, and the operator control carried by the chassis. The method includes the step of sending a force and/or vibration feedback to the operator control thereby conveying information to the operator. The information is not related to a load encountered by the tool.

An advantage of the present invention is that information is efficiently passed on to the machine operator by way of the control grasped by the operator.

Another advantage of the present invention is that in a noisy environment an alert can be quickly brought to the attention of the operator.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 3 is a flowchart illustrating a force/vibration feedback regime of one embodiment of the present invention used by the control system of FIGS. 1 and 2;

FIG. 4 is a flowchart illustrating a force feedback regime of another embodiment of the present invention used by the control system of FIGS. 1 and 2;

FIG. 6 is a flowchart illustrating yet another force feedback regime of yet another embodiment of the present invention used by the control system of FIGS. 1 and 2;

FIG. 7 is a flowchart illustrating yet another force feedback regime of yet another embodiment of the present invention used by the control system of FIGS. 1 and 2;

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
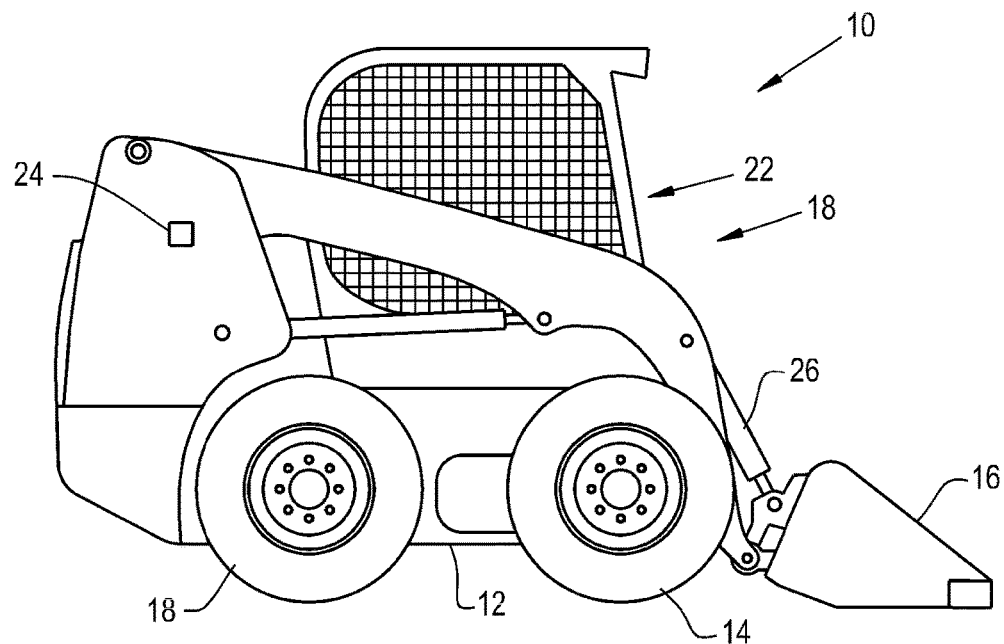
FIG. 1 is a side view of a vehicle in the form of a skid steer loader having a control system embodying the present invention.
Figure 2:
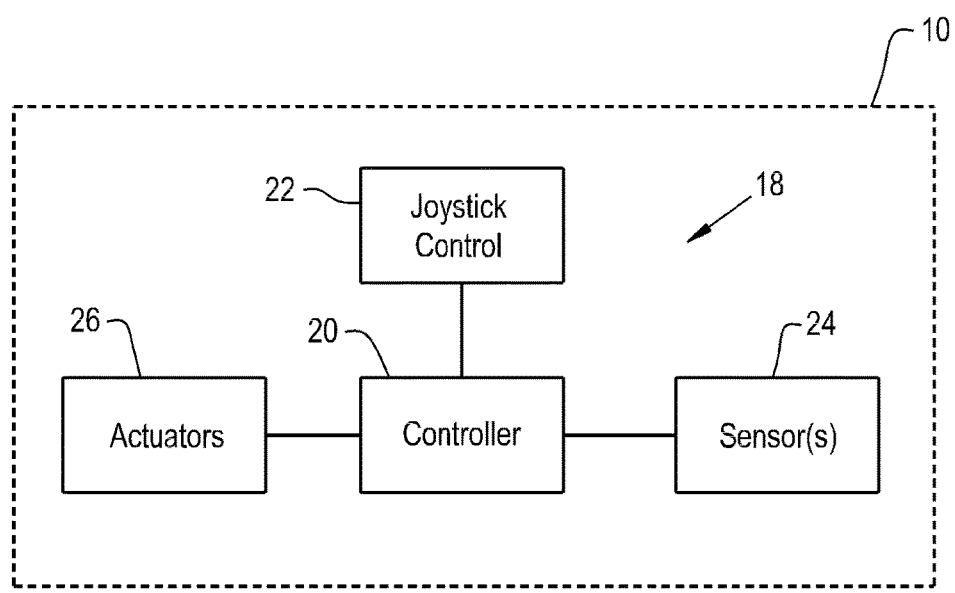
FIG. 2 is a schematical view of the vehicle of FIG. 1 having a joystick control of the present invention.

Referring now to the drawings, and more particularly to FIGS. 1 and 2 there is shown a movable machine 10 in the form of a vehicle 10 and more particularly in the form of a skid steer loader 10. The present invention is applicable to any vehicle and particularly to vehicles using controls that do not inherently have a reaction force directed back to the control that relates to a task undertaken by an operator of machine 10. Machine 10 includes a frame or chassis 12, a set of ground engaging devices, here illustrated as wheels 14, and a tool 16, here shown as a bucket 16. A control system 18 interfaces with parts of machine 10 that are not illustrated such as a transmission, an engine and other control systems. Control system 18 includes a controller 20, an operator control 22, sensors 24 and actuators 26. Controller 20 may be a stand-alone controller that communicates with other controllers used in machine 10, or the functions of controller 20 may be incorporated in another controller that performs other functions, such as an engine control unit (ECU) of machine 10.

Operator control 22 may be in the form of a joystick 22 having feedback actuators, which may be electrical motors, hydraulic actuators, pneumatic actuators or the like. For purposes of discussion, electrical actuators will be considered as providing a force feedback to joystick 22. While joystick 22 is discussed in the singular, it is understood that machine 10 may have more than one joystick 22 for controlling different aspects of machine 10 and the exemplification carried out on the two or more joysticks may be similar or different and that the force feedback may be coordinated between multiple joysticks. Controller 20 receives controlling information from joystick 22 as the operator moves joystick 22, and controller 20 sends feedback to joystick 22 to thereby enhance the experience of the operator, or to alert the operator to a new condition of machine 10, or the environment around machine 10, or a communication to the operator from a device other than machine 10.

Now, additionally referring to FIG. 3, there is illustrated a method 100, where at step 102 controller 20 determines whether machine 10 is approaching a maximum productivity and if so then at step 104 the force feedback, at least in the direction joystick 22 is being moved, has an increased stiffness or a vibration applied to joystick 22 to alert the operator of the condition. It is to be understood that the when the words "vibration" or "shaking" are used it can mean a buzzing sensation that is modulated, a fixed frequency vibration, a variable frequency vibration, of a singular or multiple amplitudes. The operator will experience the sensation in the feel of joystick 22, but that movement is such that it is either not picked up by the position sensors of joystick 22 or is eliminated by controller 20 so that such a movement is not translated into a movement of the element of machine 10 that is being controlled by joystick 22.

Now, additionally referring to FIG. 4, there is illustrated a method 200, where at step 202 it is determined whether the speed of machine 10 is beyond a predetermined amount, and if so at step 204 the axis in which joystick 22 is being moved for steering is stiffened by increasing the force feedback (based on a calculation from element 210) to thereby ensure that a steering motion is not too extreme. Then at step 206 once the speed is reduced then the force feedback in that axis is reduced to a normal force feedback, which may be reduced to zero. If the speed is still high then the steering force is again reevaluated at step 204. This method may be carried out in a gradual manner, for example, as a forward speed is increased the stiffness is increased proportionately. Conversely, as the speed is decreased then the stiffness is proportionately decreased.

Figure 5:
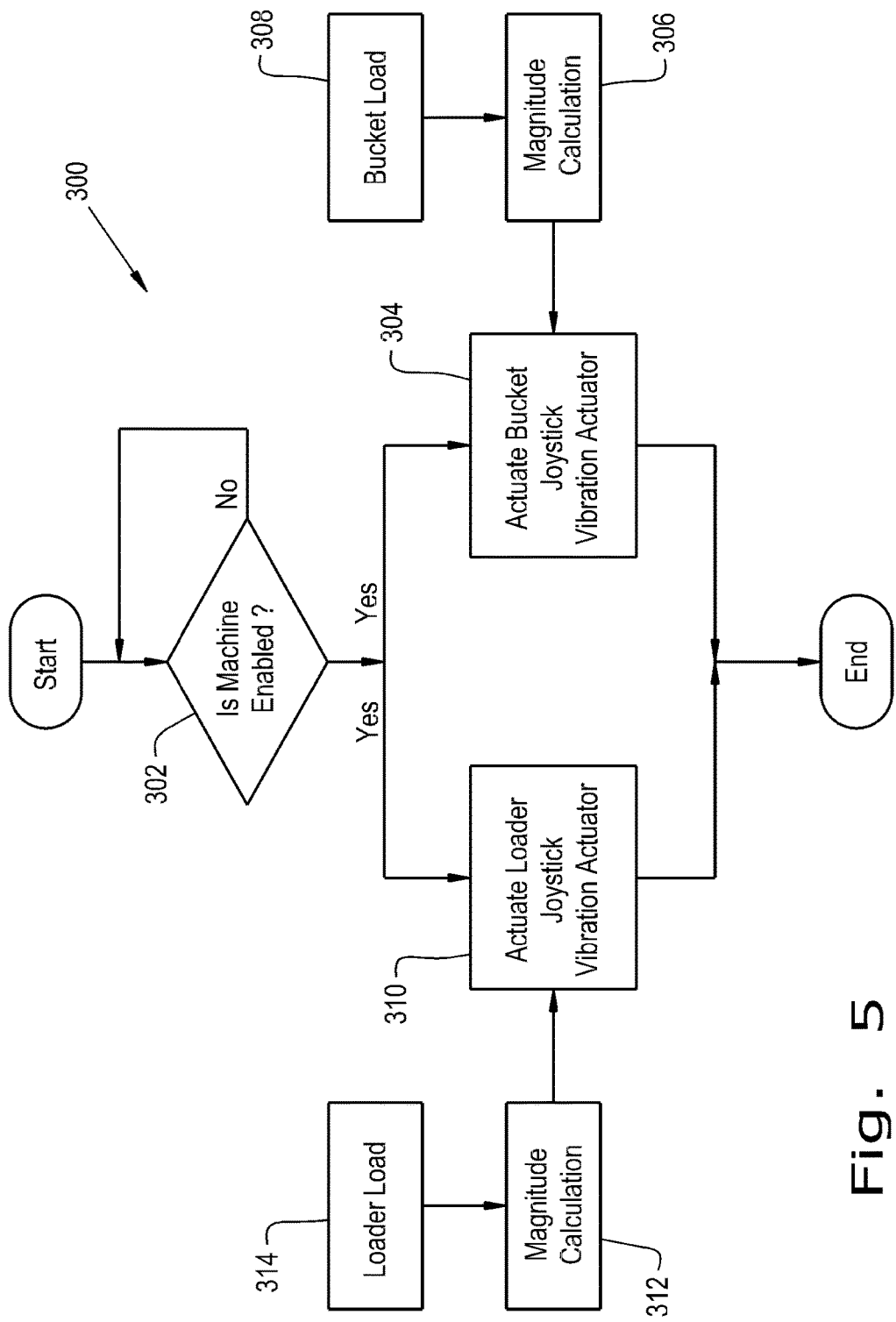
FIG. 5 is a flowchart illustrating a vibration feedback regime of yet another embodiment of the present invention used by the control system of FIGS. 1 and 2.

Now, additionally referring to FIG. 5, there is shown a method 300, where at step 302 it is determined if machine 10 is enabled. For purposes of this example two joysticks are assumed, one controlling the direction and power applied to wheels 14, and one for the operation of bucket 16. The right side of method 300, having elements 304, 306 and 308, where, as the load in bucket 16 changes, vibration feedback applied to one joystick is related to the load in bucket 16. On the left side of method 300, having elements 310, 312 and 314, is illustrated the movement of machine 10 as it is, for example, driven so that bucket 16 encounters a load on the ground, with an accompanying vibration feedback provided to the joystick controlling the movement of machine 10 and relating to the force encountered by wheels 12 as they push into a load.

Now, additionally referring to FIG. 6, there is shown a method 400, where at step 402 it is determined if the terrain is rough, such as a predetermined amount of bounce is being experienced by machine 10. If so, then at step 404 the stiffness of movement of joystick 22 is increased by an increase in the force feedback applied thereto. Once it is determined (at step 406) that the terrain is no longer too rough, then at step 408 the stiffness of movement of joystick 22 is reduced. This helps to preclude unintended movement of joystick 22 when machine 10 is encountering unusually uneven ground.

Now, additionally referring to FIG. 7, there is shown a method 500, where at step 502 it is determined whether the bucket shake selection is active and bucket 16 is being emptied. If so, then the force feedback to joystick 22 is reduced at step 504 to allow the operator to easily shake bucket 16 to knock loose any material therein. Then if the bucket is not being emptied hence bucket shake is no longer active, as determined at step 506, then the force feedback is returned to a normal or previous level at step 508.

Figure 8:
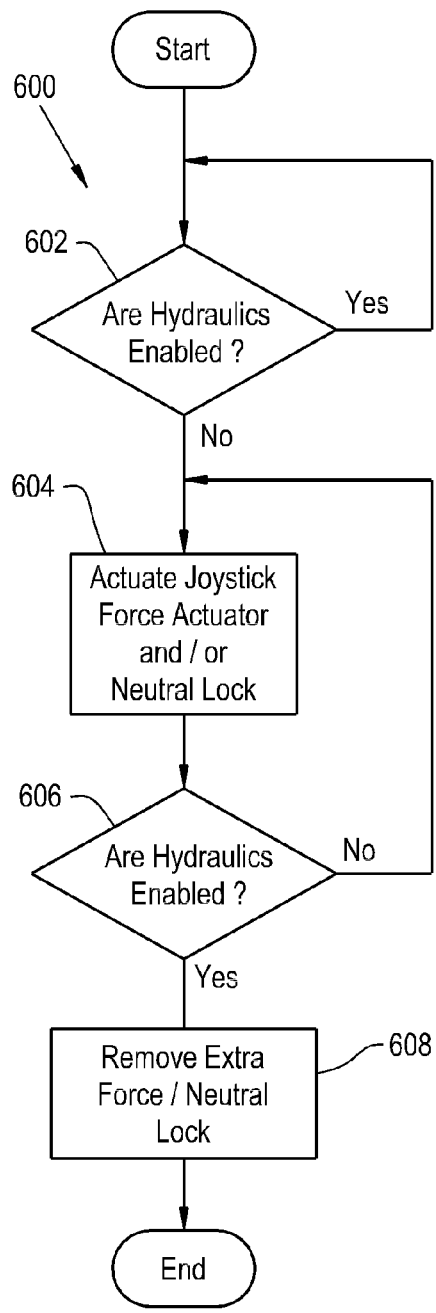
FIG. 8 is a flowchart illustrating yet another force feedback regime of yet another embodiment of the present invention used by the control system of FIGS. 1 and 2.

Now, additionally referring to FIG. 8, there is shown a method 600, where at step 602 it is determined if the hydraulic system of vehicle 10 is enabled, if not then at step 604 the force feedback to joystick 22 is increased to lock joystick 22 from being moved. Alternatively, a neutral lock can be applied to joystick 22. Once the hydraulic system is enabled, as detected at step 606, then any extra force or neutral lock is removed at step 608 from joystick 22.

Figure 9:
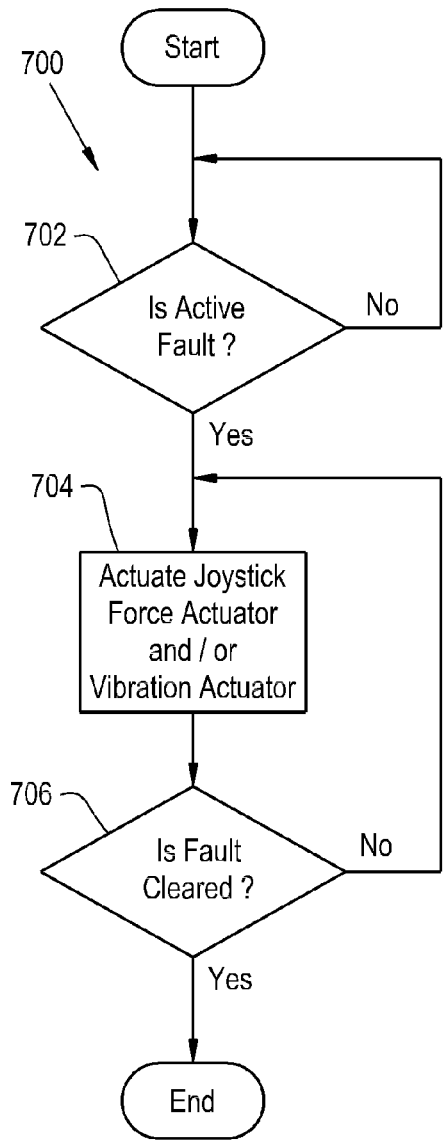
FIG. 9 is a flowchart illustrating yet another force/vibration feedback regime of yet another embodiment of the present invention used by the control system of FIGS. 1 and 2.

Now, additionally referring to FIG. 9, there is shown a method 700, where at step 702 controller 20 is alerted to an active fault code, then at step 704 that information is conveyed to the operator by a change in the force feedback and/or by using a vibration of joystick 22. This may result in the operator then being made aware of an element now being displayed on a display (not illustrated). The continuation of a serious fault continues to alert the operator until the fault is cleared (step 706), or after a predetermined amount of time. It is contemplated that a vibration of joystick 22 may be in an axis, which is not currently being activated, or even in an unused axis. For example, if joystick 22 only operates in an X-Y plane, then the vibration may be in the Z direction.

Figure 10:
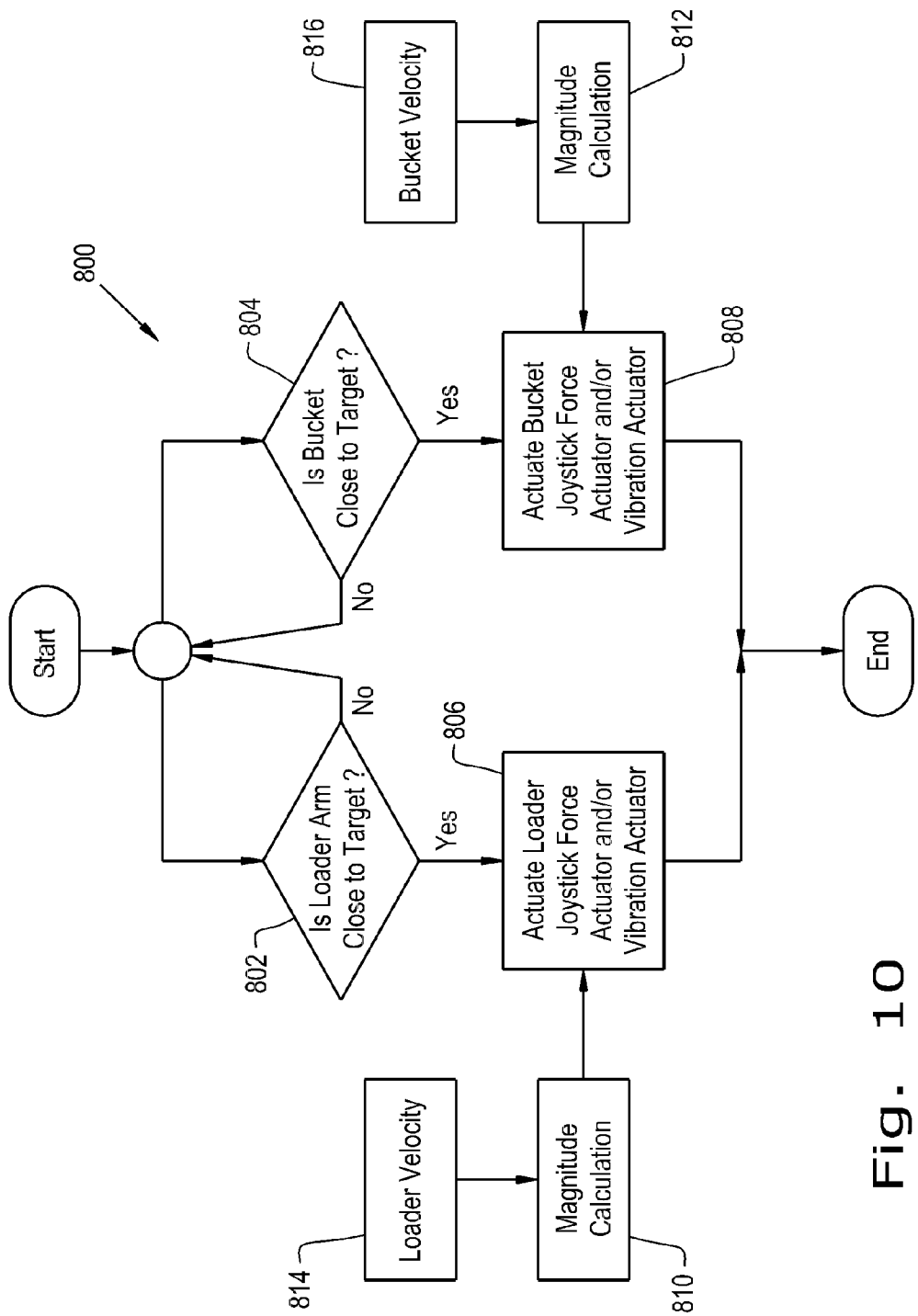
FIG. 10 is a flowchart illustrating yet another force/vibration feedback regime of yet another embodiment of the present invention used by the control system of FIGS. 1 and 2.

Now, additionally referring to FIG. 10, there is shown a method 800, which is again perhaps a two joystick situation, where at steps 802 and 804 it is determined respectively if the loader arm and the bucket are close to target positions and if so then the particular joystick has a change in the force feedback and/or a vibration applied (steps 806 and 808) to alert the operator that a target has been approached. The illustration shows inputs from elements 810, 812, 814 and 816 respectively, which may include information from sensors 24. The magnitude of the force and/or vibration feedback is based on the velocity and/or distance from the target position.

Figure 11:
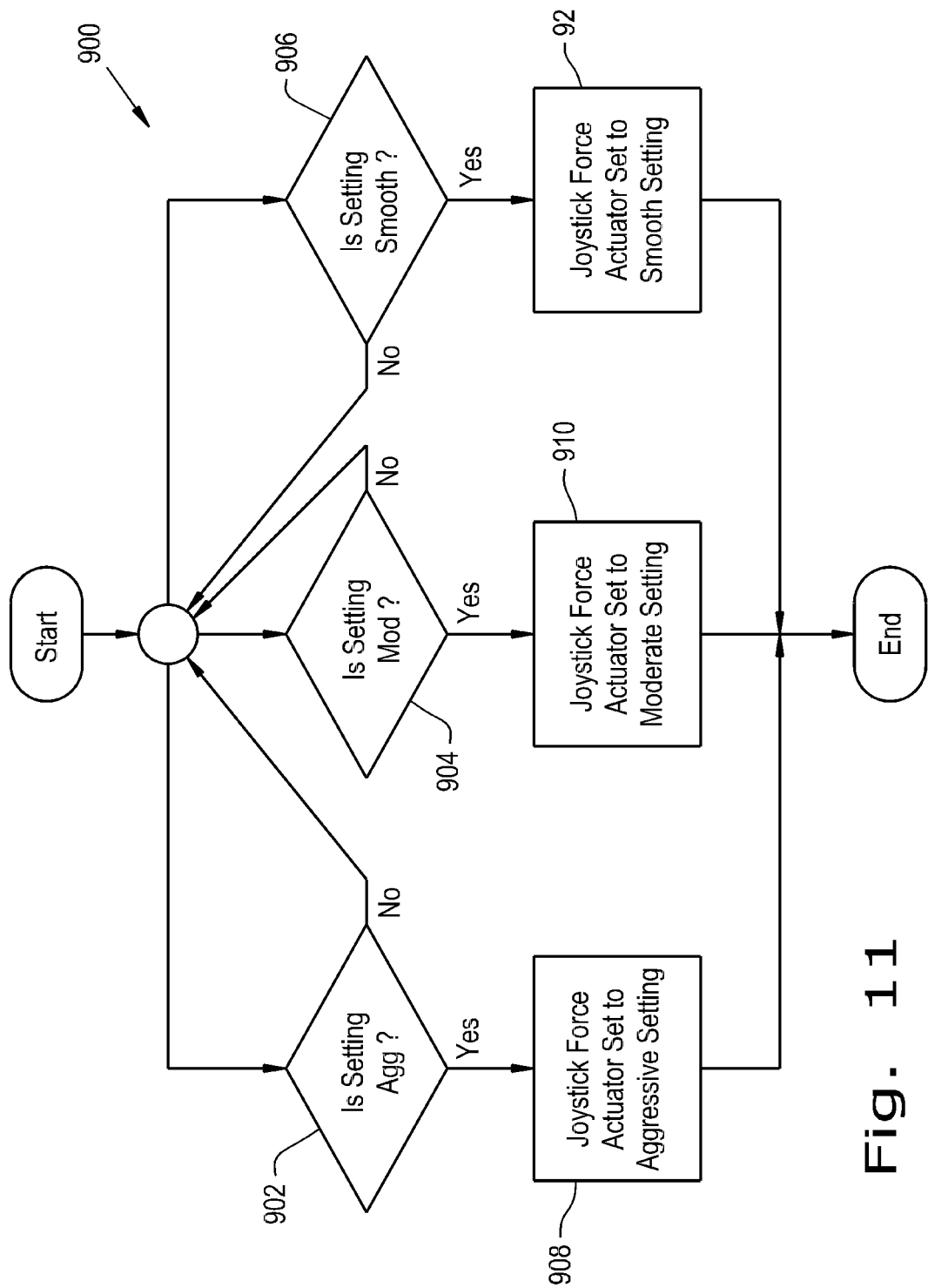
FIG. 11 is a flowchart illustrating yet another force feedback regime of yet another embodiment of the present invention used by the control system of FIGS. 1 and 2.

Now, additionally referring to FIG. 11, there is shown a selection method 900, where at elements 902, 904 and 906 it is determined if the operator is selecting an aggressive setting (902), a smooth setting (906) or in between, a mid setting (904). As a result of the selection then the application of the force feedback, of the other methods discussed herein, are respectively selected to thereby correspond with the selected element 908, 910 or 912.

Figure 12:
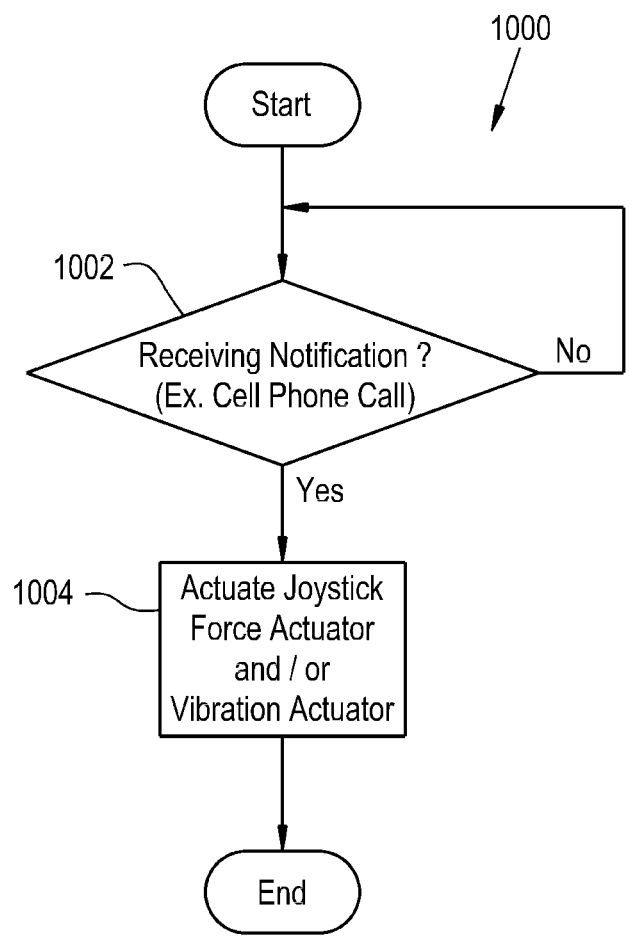
FIG. 12 is a flowchart illustrating yet another force/vibration feedback regime of yet another embodiment of the present invention used by the control system of FIGS. 1 and 2.

Now, additionally referring to FIG. 12, there is shown a method 1000, where at step 1002 it is determined if the operator is receiving a notification. If so, then joystick 22 has the force feedback changed or a vibration is caused in joystick 22 at step 1004. The notification may be the operator's cell phone (by way of a Bluetooth® connection) or a radio squelch being broken and conveyed to controller 20. There may be a cell phone interface in the form of a Bluetooth Connectivity module that sends an alert to controller 20 when the operator's cell phone rings, which in turn causes the joystick vibration actuator to vibrate joystick 22 to thereby alert the operator to answer a phone call. Other forms of communication are also contemplated that may result in a similar alert to the operator. If more than one form of communication signal is sent to controller 20 the vibration sent to joystick 22 can be selected to have a unique vibration sensation to correspond with the specific communication signal. For example, one form could be an intermittent vibration, and another a constant vibration.

Figure 13:
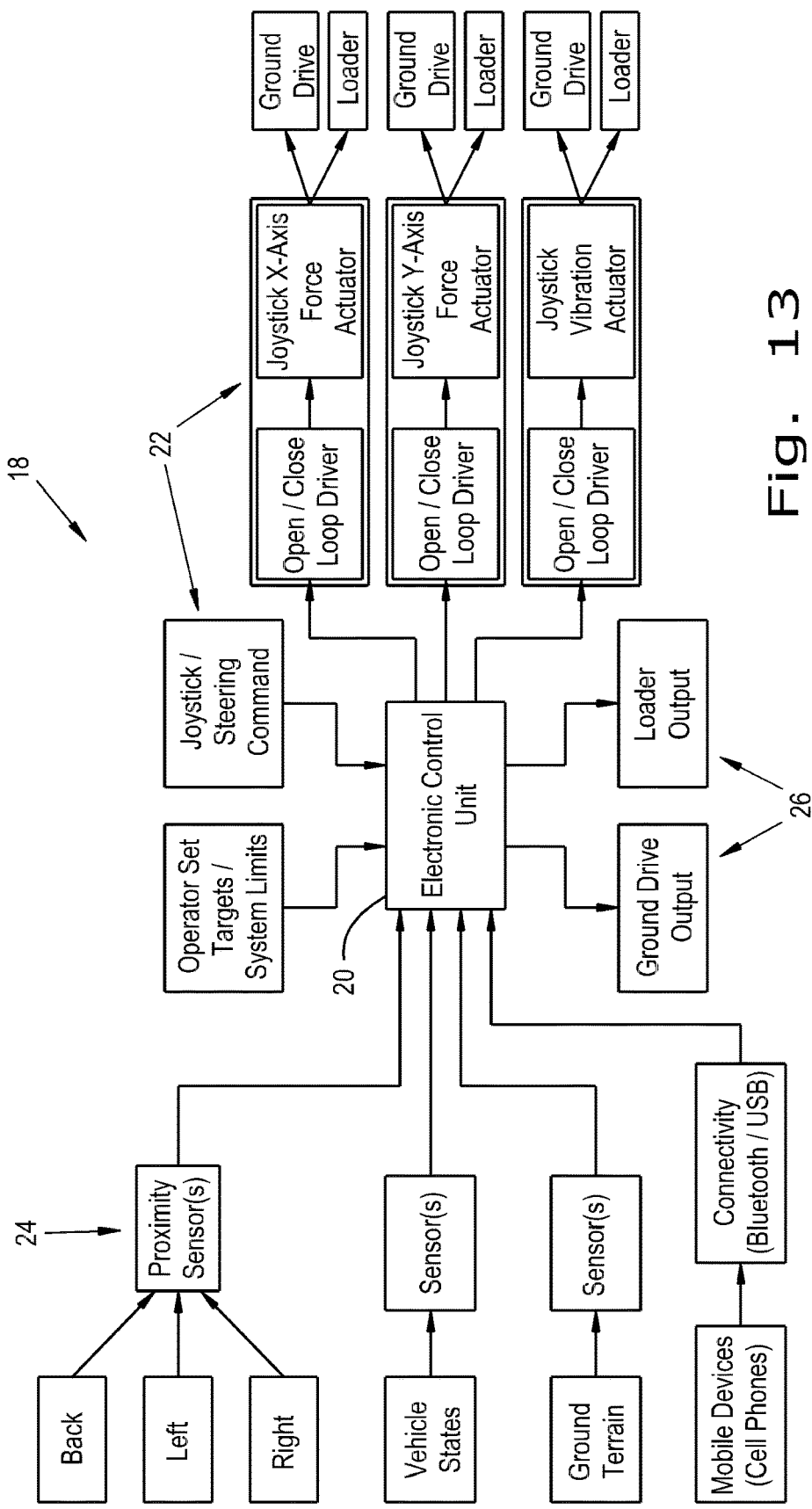
FIG. 13 is a functional block diagram illustrating components and functions of the control system of FIGS. 1 and 2.

Now, additionally referring to FIG. 13 there is shown functional elements of an embodiment of the present invention that may exist in control system 18. Sensors 24 may be in the form of proximity sensors (back, left and right), sensors reporting the states of vehicle 10, and/or ground terrain sensors, all of which provide information to controller 20. Also illustrated is the connectivity of a cell phone. Actuators 26 provide motion to the drives of machine 10 upon the command from joystick 22. The X-axis and Y-axis force actuators are also depicted as part of joystick 22. The vibration actuator of joystick 22 is also illustrated. It is shown that the force feedback can be effected individually by the X, Y or vibration actuators or in a coordinated manner, and that they can be related either to the ground drive or the loader.

Figure 14:
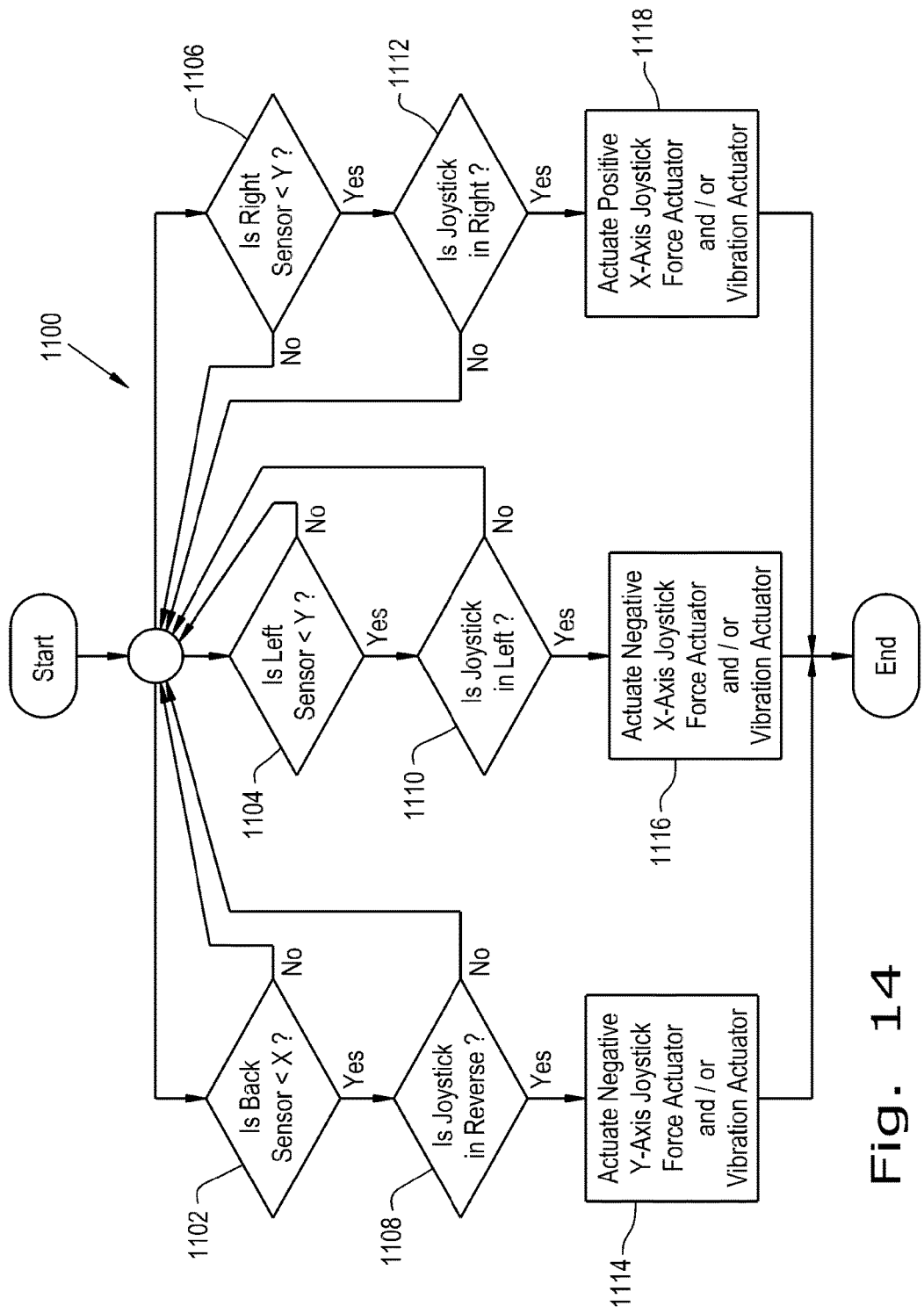
FIG. 14 is a flowchart illustrating yet another force/vibration feedback regime of yet another embodiment of the present invention used by the control system of FIGS. 1 and 2.

Now, additionally referring to FIG. 14 there is shown a flowchart illustrating the functioning of an embodiment of the present invention in the form of a method 1100. At steps 1102, 1104 and 1106, the respective sensors 24 detect an object that is less than a predetermined distance (X, Y-left or Y-right) from machine 10. Then if joystick 22 is being directed in the direction that would bring machine 10 closer to the object (respectively steps 1108, 1110 or 1112), then the force feedback in that direction and/or the vibration actuator is activated, and may increase as the object is more closely approached. The force feedback can be in the form of an increased force feedback in the direction that relates to the position of a detected object. For example, if an object is detected on the left side, then the force feedback associated with that part of the joystick is increased. Additionally, the vibration actuator may be actuated to alert the operator that something has been detected and that machine 10 may be on a collision course with the object.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A movable machine, comprising:
   a chassis;
   a work implement coupled to said chassis;
   an operator control carried by said chassis, said operator control being configured to control an operation of said work implement; and
   a controller communicatively coupled to said operator control, said controller configured to send at least one of a force feedback or a vibration feedback to said operator control thereby conveying information to an operator, said information not being related to a load encountered by the work implement.

2. The movable machine as claimed in claim 1, wherein at least one of said force feedback or said vibration feedback is altered by said controller dependent upon to at least one of a steering change, a speed of the machine, a power limit of the machine being approached, a detection of rough terrain, detection of a shake bucket command, a detection of a control lock, a fault code, an operator preference selection, a communication message for the operator, or a detected obstacle.

3. The movable machine as claimed in claim 2, wherein at least one of said force feedback or said vibration feedback is altered by said controller dependent upon the detected obstacle being detected in at least one of to a side of the machine or behind the machine.

4. The movable machine as claimed in claim 2, wherein at least one of said force feedback or said vibration feedback is altered by said controller dependent upon the communication message for the operator, the communication message being an alert from a communication device.

5. The movable machine as claimed in claim 2, wherein at least one of said force feedback or said vibration feedback is altered by said controller dependent upon said preference selection, said preference selection including a selection of a type of feedback the operator would want to experience when a selected event is detected by said controller.

6. The movable machine as claimed in claim 2, wherein at least one of said force feedback or said vibration feedback is altered by said controller dependent upon the fault code being sent to the controller.

7. The movable machine as claimed in claim 2, wherein at least one of said force feedback or said vibration feedback is altered by said controller dependent upon the detection of said control lock.

8. The movable machine as claimed in claim 2, wherein at least one of said force feedback or said vibration feedback is altered by said controller dependent upon the detection of said shake bucket command.

9. The movable machine as claimed in claim 2, wherein at least one of said force feedback or said vibration feedback is altered by said controller dependent upon the detection of rough terrain which the machine is traversing or is about to traverse.

10. The movable machine as claimed in claim 2, wherein at least one of said force feedback or said vibration feedback is altered by said controller dependent upon the power limit of the machine is being approached.

11. The movable machine as claimed in claim 2, wherein at least one of said force feedback or said vibration feedback is altered by said controller dependent upon the speed of the machine.

12. The movable machine as claimed in claim 2, wherein at least one of said force feedback or said vibration feedback is altered by said controller dependent upon a steering change of the machine.

13. The movable machine as claimed in claim 1, wherein at least one of said force feedback or said vibration feedback to said operator control is in a form of at least one of an increasing stiffness of said control, a decreased stiffness of said control, a preventing of movement of the control, a shaking of the control, a variable frequency movement of the control, or a fixed frequency movement of the control.

14. The movable machine as claimed in claim 1, wherein the work implement comprises at least one of a bucket, a blade, or a boom.

15. A force feedback method for an operator control of a movable machine, the machine having a chassis, a work implement coupled to the chassis, and the operator control carried by the chassis, the operator control being configured to control an operation of the work implement, the method comprising:
  receiving, with a controller coupled to the operator control, an input from the operator control associated with the operation of the work implement; and
  sending, using the controller, a force feedback to the operator control thereby conveying information to an operator, said information not being related to a load encountered by the work implement.

16. The method of claim 15, further comprising the step of altering at least one of said force feedback or said vibration feedback dependent upon to at least one of a steering change, a speed of the machine, a power limit of the machine being approached, a detection of rough terrain, detection of a shake bucket command, a detection of a control lock, a fault code, an operator preference selection, a communication message for the operator, or a detected obstacle.

17. The method of claim 16, wherein at least one of said force feedback or said vibration feedback is altered dependent upon the detected obstacle being detected in at least one of to a side of the machine or behind the machine.

18. The method of claim 16, wherein at least one of said force feedback or said vibration feedback is altered dependent upon the communication message for the operator, the communication message being an alert from a communication device.

19. The method of claim 16, wherein at least one of said force feedback or said vibration feedback is altered dependent upon said preference selection, said preference selection including a selection of a type of feedback the operator would want to experience when a selected event is detected by said controller.

20. The method of claim 15, wherein the work implement comprises at least one of a bucket, a blade, or a boom.

\* \* \* \* \*